United States Patent
Hansen (10) Patent No.: US 9,694,222 B2
(45) Date of Patent: Jul. 4, 2017

(54) METHOD AND NOZZLE FOR FIREFIGHTING

(75) Inventor: Bjørn R. Hansen, Lillehammer (NO)

(73) Assignee: PREVENT SYSTEMS AS, Lillehammer (NO)

(*) Notice: Subject to any disclaimer, the term of this patent is extended or adjusted under 35 U.S.C. 154(b) by 76 days.

(21) Appl. No.: 14/118,627

(22) PCT Filed: May 22, 2012

(86) PCT No.: PCT/NO2012/050095
§ 371 (c)(1),
(2), (4) Date: Feb. 26, 2014

(87) PCT Pub. No.: WO2012/161586
PCT Pub. Date: Nov. 29, 2012

(65) Prior Publication Data
US 2014/0158383 A1    Jun. 12, 2014

(30) Foreign Application Priority Data
May 23, 2011 (NO) .................................. 20110761

(51) Int. Cl.
*A62C 37/11* (2006.01)
*A62C 35/68* (2006.01)
(Continued)

(52) U.S. Cl.
CPC .............. *A62C 37/11* (2013.01); *A62C 35/68* (2013.01); *A62C 37/08* (2013.01);
(Continued)

(58) Field of Classification Search
CPC ..... A62C 37/08–37/16; A62C 99/0072; B05B 15/001; F16K 17/38; F16K 17/383
(Continued)

(56) References Cited

U.S. PATENT DOCUMENTS 2,389,331 A    11/1945 Tyden
4,015,665 A *  4/1977 Simons .................. A62C 37/09
                                                      169/40
(Continued)

FOREIGN PATENT DOCUMENTS

EP    1 010 442 A2    6/2000
JP    2000-354641 A   12/2000

OTHER PUBLICATIONS

International Search Report received in PCT/NO2012/050095 dated Sep. 3, 2012.
(Continued)

*Primary Examiner* — Arthur O Hall
*Assistant Examiner* — Cody Lieuwen
(74) *Attorney, Agent, or Firm* — Foley & Lardner LLP (57) ABSTRACT

A firefighting medium is allowed to escape from a nozzle through apertures, the nozzle being provided with an internally arranged valve in sealing contact with a valve seat until the valve is released from its sealing position. The release is caused by a heat sensible release mechanism acting on the valve, whereby the sealing effect of the valve is relieved. A locking force required for maintaining the sealing effect by a removable cap or cover is provided, attached to the nozzle front, the locking force being established between at least two interacting surfaces. By releasing the sealing effect of the valve by removing the locking effect between the two interacting surfaces, the cap or cover is allowed to drop off its seat on the nozzle, relieving the press causing the sealing effect on the valve of the nozzle, the removal of the cap or cover caused by releasing mechanism.

21 Claims, 4 Drawing Sheets

(51) Int. Cl.
  *A62C 37/08* (2006.01)
  *A62C 99/00* (2010.01)
  *F16K 17/38* (2006.01)
  *B05B 15/00* (2006.01)
(52) U.S. Cl.
  CPC ........ *A62C 99/0072* (2013.01); *F16K 17/383* (2013.01); *B05B 15/001* (2013.01)
(58) Field of Classification Search
  USPC ........ 169/37–41, 46, 51, 57–59, 90, DIG. 3; 239/288–288.5; 137/79
  See application file for complete search history.

(56) References Cited

U.S. PATENT DOCUMENTS

| | | | |
|---|---|---|---|
| 4,664,198 A | | 5/1987 | Johnson |
| 6,044,912 A | * | 4/2000 | Tsuji et al. ............... 169/37 |
| 6,112,821 A | * | 9/2000 | Yokoi ............... 169/41 |
| 6,123,153 A | | 9/2000 | Finnegan |
| 6,152,236 A | * | 11/2000 | Retzloff et al. ............... 169/57 |
| 2002/0129946 A1 | * | 9/2002 | Retzloff ................ A62C 37/09 169/37 |
| 2010/0089597 A1 | | 4/2010 | Neeb et al. |
| 2010/0263883 A1 | * | 10/2010 | Abels et al. ................. 169/37 |

OTHER PUBLICATIONS

Extended European Search Report received in European Patent Application No. 12790248.4 on Oct. 30, 2015, 2 pages.
Patent Examination Report No. 1 dated Apr. 26, 2016, received in corresponding Australian application No. 2012259525, 3 pages.
Supplementary European Search Report dated Oct. 30, 2015, received in corresponding European application No. 12 79 0248.4, 13 pages.

* cited by examiner

METHOD AND NOZZLE FOR FIREFIGHTING

This application is the National Phase of PCT/NO2012/050095, filed May 22, 2012, which claims priority to Norwegian Application No. 20110761, filed May 23, 2011, the disclosures of which are hereby incorporated by reference in their entirety.

TECHNICAL FIELD OF THE INVENTION

The present invention relates to a method and a nozzle for firefighting, using water, suited to be installed on a wall or in a ceiling. Water is supplied and allowed to escape from a nozzle through a number of apertures, the nozzle being provided with an internally arranged valve in sealing contact with a valve seat until the valve is released from its sealing position, said release being caused by a heat sensible release mechanism acting on the valve, whereby the sealing effect of the valve is relieved or suspended when an increase in temperature is detected.

The nozzle is suited for being installed on a wall or in a ceiling for firefighting purposes and is configured to produce a firefighting flow of water into rooms where the firefighting system is installed, such water flow for example may be in the form of a mist of fine, minute droplets, or more concentrated flows in one or more sectors. Further, the nozzle is provided with an internally arranged valve configured to be in sealing contact with a valve seat until the valve is released from its sealing position, said releasing being caused by a release mechanism acting on the valve, providing and suspending the sealing effect of the valve.

BACKGROUND FOR THE INVENTION

Firefighting systems incorporating a number of nozzles, connected to water source by means of a pipe system, are well known. According to such systems, the nozzles are provided with a release mechanism, communicating with the valves or the like for allowing water to leave the nozzle if and when a fire is detected and the nozzle is actuated. Further, it is well known to use trigger rods, such rods comprising a thin-walled cavity containing a liquid. When the liquid in the cavity is heated to a certain degree, it expands and thus breaks the wall of the cavity, thus releasing the sealing effect on the valve and allowing opening of the valve.

NO 319353 discloses a protection of a rotating nozzle arranged in a house which partly surrounds the nozzle. The protection comprises a cap which is attached to the house in a releasable manner in order to form a surrounding chamber for the nozzle, where the cap comprises an opening allowing a breakable element to project axially through the cap. According to this solution it is the trigger rod forms the release mechanism which directly releases the valve inside the nozzle, also releasing the cap at the same time.

Such solution is provided with a frame containing the trigger rod, such trigger rod being in direct contact with the valve. Further, such frame projects perpendicularly out from the nozzle and is highly visible. Accordingly, when the release mechanism of the system according to NO 319353 must be changed or maintenance work is in progress, the entire, or at least branches of the system must be drained off, and then refilled with water upon completed maintenance work.

It is therefore a need to provide a nozzle which does not to any degree extend perpendicular out from the supporting wall or ceiling. Further there is a need for a nozzle having a neutral, nearly not visual and esthetical appearance. Moreover there is need for a solution where the entire system may be vented without having to close down the system or temporarily setting a nozzle, a branch or the entire system out of function.

SUMMARY OF THE INVENTION

An object of the invention is to provide a firefighting nozzle solution which nearly is flush with the surrounding wall or ceiling, giving an esthetical appearance, and still being able to provide a spray of water or other firefighting medium, both laterally and axially, covering the entire space to be protected, the solution being suitable to be applied both on ceilings and walls.

A further object of the invention is to provide a solution where it is possible to moist the surface in the close vicinity or surrounding area of each nozzle.

Another object of the present invention is to provide a simplified system where there is no need for having additional around the clock guarding or use of additional guards during maintenance of the release mechanisms or replacements of the trigger systems.

Another object of the invention is to provide an improved nozzle solution being configured to enhance the installation procedure and where it may be possible to replace the release mechanism without having to suspend the locking effect of the release system and/or having to drain out at least a part of the entire system.

Another object of the present invention is to provide an enhanced system where it is possible to vent out air from the system in a simple and efficient manner without causing any degree of or just a very small seepage of the liquid out of the system.

Another object of the invention is to provide a solution to remove air pockets in the piping system, making it safe and secure to use plastic pipes in the supply net from the water source to each nozzle without increasing the risks for pipe failure in case of a fire.

Another object of the invention is to provide a nozzle where the release mechanism easily and in a simple and effective manner may be removed from its seats and replaced without causing triggering of the release system.

Yet another object of the present invention is to provide an enhanced system where it is possible to pretension the locking effect of the release mechanism of the nozzle.

A still further object of the present invention is to provide a release mechanism which more or less is independent of the dimensions of the trigger rod applied.

An object of the present invention is also to provide a solution where it is possible by a simplified visual inspection to check out whether temporary locking means used for example during maintenance for disarming the nozzle has been removed or not.

Another object of the present invention is to provide an enhanced nozzle where the trigger mechanism is protected from unintentional release of the locking effect, and still having improved exposure to the environmental air, enabling detection of increase in ambient temperature.

A further object of the invention is to provide nozzle with fittings or a flange, where the space between the bore in the wall or ceiling and the nozzle/pipe is covered by the nozzle and/or the cap or cover, preventing or at least delaying flames or heat from the fire to get access into the building structure around the nozzle during a fire.

Yet another object of the present invention is to provide a release mechanism where the release mechanism is not intended to directly resist the pressure acting inside the fire fighting piping system.

According to the present invention, the objects are achieved by means of a method and a nozzle as further defined by the independent claims, while alternatives and embodiments or variants are defined by the dependent claims.

The method according to the invention includes provision of the force required for maintaining the sealing effect by means of a removable cap or cover, attached to and preferably covering at least a part of the nozzle front, said force being in the form of friction between at least two interacting surfaces, and by releasing the sealing effect of the valve by removing the friction between said at least two interacting surfaces, allowing the cap or cover to drop off its seat on the nozzle, relieving the locking pressure causing the sealing effect on the valve of the nozzle, the removal of the cap or cover being caused by an incorporated releasing mechanism.

According to an embodiment of the invention, the cap or cover is configured to be removed by a slight rotational movement of the cap or cover around the axis of the nozzle when the locking force from the release mechanism is suspended.

According to a further embodiment air which possibly is trapped in the nozzle, or in the system, may be vented without having to remove the locking mechanism or suspending the locking force acting on the valve. Further, the removable cap may be configured in such way that it is possible to remove the trigger mechanism without having to drain the system and/or without releasing the holding effect of the valve.

According to another embodiment, the cap may still be held in fixed position when the trigger mechanism is removed by inserting one or more pins into holes in the cap, the holes being aligned with corresponding holes or recesses in the nozzle body, thus preventing the cap from dropping off from its seat on the nozzle during such stage.

The nozzle according to the present invention is provided with a release mechanism which comprises a cap connected to the nozzle front in such way that when a fire or sufficient high temperature is detected, the cap is configured to drop off its seat on the nozzle end, suspending the sealing effect of the valve and allowing water to flow through and out of the nozzle, thus producing the required firefighting spray or mist.

The cap may preferably be attached to the nozzle in a releasable manner by means friction and/or pressure forces established between at least one pair of surfaces on the cap and interacting surfaces on the nozzle front, such frictional forces being produced by a heat sensitive trigger rod pressing the surfaces in a pair into frictional and/or pressure engagement between each other, one of the surfaces in a pair being formed on the cap and the other surface being formed on the nozzle.

The second surface in a pair may preferably be provided on an attachment plate removably attached or fixed to the free end surface of the nozzle.

Further, the interacting surfaces may preferably be inclined or slanted with respect to the axial direction of the nozzle and possibly also having additional surfaces forming a helical pattern, the interacting surface(s) on the attachment plate being arranged along the circumference of the attachment plate on the nozzle.

According to another embodiment the cap may be provided with one or more means for temporarily locking the cap in position with respect to the nozzle in periods where the releasing means shall be repaired, subjected to maintenance or being replaced, thus avoiding release of the sealing valve inside the nozzle. Such temporarily locking means may for example either be in the form of one or more set screws, screwed through a threaded hole in a rim of the cap and engaging the nozzle or the attachment plate in a locking manner, or a long screw which extend between two pairs of locking surfaces, locking the interacting surfaces together. Alternatively, said temporarily locking means may be in the form of a clamp or loop with ends inserted through holes in the cap and corresponding holes in an attachment plate.

The release mechanism may according to an embodiment of the invention comprise a heat sensitive trigger rod, such rod providing the pressure producing the required friction to lock the cap or cover on to the end of the nozzle, such friction and/or pressure being sufficient to resist the force acting on the cap or cover through the stem of the seal, caused by the fluid pressure inside the piping system, where one end of the trigger rod rests against a surface on the nozzle itself or an attachment plate arranged on the nozzle and the opposite end of the trigger rod rests against an end of a set screw, thereby allowing adjustment of the frictional forces produced.

Further, the nozzle may be provided with means for venting the nozzle, such venting means comprises a valve comprising a ball pressed into sealing contact by a spring and accessed for manipulation of the sealing contact through an opening in the cap and axially through the valve stem and valve body, or in case the stem is made hollow, through the bottom end of the stem.

According to the present invention it is possible to change or maintain the release mechanism without having to drain the system or to suspend the alertness and the readiness of the system.

Another advantage is that it is possible to vent the system in a very easy manner without causing possible water spillage.

Another advantage resides in that the nozzle will be more or less flush with the wall or ceiling, thus eliminating, or at least reducing the dominant appearance of the nozzles. Hence, such nozzles are very suitable to be arranged on building constructions where the firefighting nozzles shall be invisible, such structure for example including heritage or very old buildings or the like.

According to the present invention the release mechanism is arranged in such way that the release mechanism is protected from intentional tampering, manipulation or accidental releasing, the release mechanism being arranged in a retracted position with respect to the exposed surface of the cap or cover. Further, the cap or cover is provided with several openings and internal spacing, allowing the ambient air to flow through the cap or cover, past the release mechanism, thereby securing that the release mechanism will suspend or release the sealing effect of the nozzle and allowing the trigger mechanism to be exposed to increased ambient temperature at an earlier stage.

Another advantage of the system according to the present invention is that the release mechanism, i.e. the trigger rod will not be directly exposed to the pressure of the extinguisher fluid acting inside the piping and valve system. As a consequence, the thickness of the glass wall of the trigger rod may be reduced, providing a quicker reaction time when exposed to increased temperature.

Further, if it for one reason or another is necessary to increase or reduce the pressure of the extinguisher system according to the invention, it is not necessary to replace the trigger rods with trigger rods designed for the new pressure.

SHORT DESCRIPTION OF THE DRAWINGS

An embodiment of the invention shall now be described in connection with the accompanying drawings, where:

FIGS. 3a and 3b shows schematically a section through the nozzle, prior to and after release of the sealing valve in the nozzle, while

FIG. 10 and FIG. 11 show an alternative embodiment for temporarily locking of the cap or cover to the attachment during periods for service, maintenance or repairing, FIG. 10 showing the temporarily locking means in a dissembled state while FIG. 11 shows, partly in section, the locking means in connected state.

DETAILED DESCRIPTION OF THE INVENTION

Figure 1:
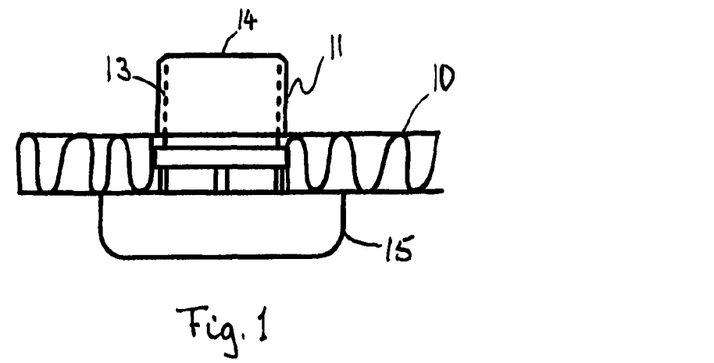
FIG. 1 shows schematically a section through a ceiling being provided with a nozzle with a cap or cover according to the present invention, the supply tube being omitted for clarity reasons.
Figure 2:
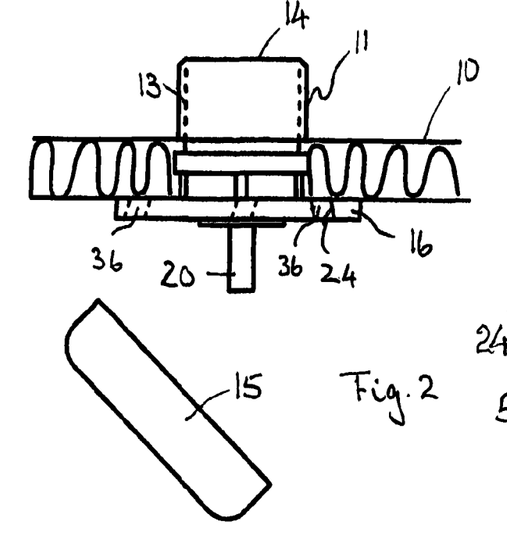
FIG. 2 shows schematically the section shown in FIG. 1, where the cap or cover has been released from its position on the nozzle.
Figure 3A:
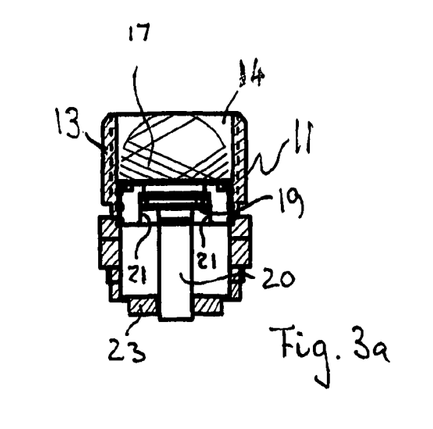
Figure 3B:
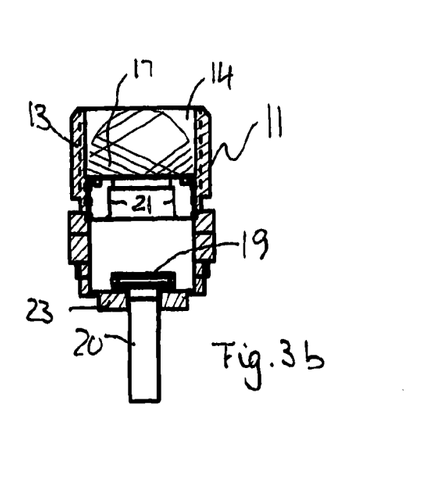

FIGS. 1 and 2 shows schematically a section through a ceiling 10 being provided with a nozzle 11 with a releasable cap or cover 15 according to the present invention, while FIGS. 3a and 3b shows schematically a section through the nozzle 11, prior to and after release of cover 15 and hence, the sealing valve 20 in the nozzle 11. The nozzle 11 is preferably of a type intended for stationary fire-fighting, intended to be installed on walls and/or ceilings, producing a mist of fine, minute droplets or a spraying of a fire-fighting liquid into a space or a room. The water pressure may for example be in the region of 0.5-12 bars. The nozzle 11 has a cylindrical shape with a circular cross section area and is provided with a number of apertures, for example in radial and/or axial direction. The nozzle 11 is provided with a threaded sleeve 13, intended to be screwed or coupled to a supply pipe (not shown), communicating with a fluid reservoir (not shown). The means for coupling to the supply pipe is of a type well known to the person skilled in the art and will not be further described herein. In order to enhance correct and proper fitting of the nozzle 11 to the supply line, the nozzle 11 is preferably provided with a hexagonally shaped flange (not shown), allowing the installer to screw the nozzle 11 on to the fittings (not shown) at the end of the supply line, applying conventional torque and wrench tools. The nozzle 11 may be provided with a number of small radial arranged holes (not shown), communicating with a large diameter hole 14, centrally arranged in the nozzle body 11. Further, the nozzle 11 may also be provided with holes (not shown) extending more or less in axial direction of the nozzle 11, enabling the nozzle 11 to produce a mist or firefighting spray in all required directions.

As indicated in FIG. 1, the nozzle 11 is provided with a cap or a cover 15 attached to the nozzle by means of an attachment plate 16. Since the holes and their apertures may be small diameter holes, the nozzle 11 is provided with an internally arranged fine masked strainer 17, arranged upstream the small holes or apertures, preventing particles, such as sand or the like, from blocking the holes or their apertures.

The nozzle 11 is also provided with an internally arranged valve, comprising a valve body 19 with a first, upper and second lower sealing surface, the valve body 19 being fixed to a valve stem 20, the valve body 19 also being provided with a sealing O-ring, resting against an internally and axially arranged cylindrical valve sealing surface, forming an inner wall fixed internally in the large diameter hole 14, ref. FIG. 3a. At the opposite side of the valve body 19, a second sealing surface is formed, intended to rest in a sealing manner against a sealing seat on the nozzle body 11 when the valve 19 is released from its watertight sealing position. Said sealing surface 21 and sealing seat prevent the liquid from flowing out of the nozzle in an uncontrolled manner, thus forcing all the liquid to flow out only through the hole. Further features of the valve body 19 and the stem 20 will be described in further details below, referring to FIG. 12 as referred to above.

The nozzle 11 is provided with a release mechanism which will be described below in connection with FIGS. 4-10.

According to the mode shown in FIG. 1, showing the nozzle 11 with the cap or cover 15 in an assembled state, the valve is in a position as disclosed in FIG. 3a. In this assembled condition, a low liquid pressure in the pipe will exert a downwards (on the drawing) pressure on the upper surface of the valve body 19, tending to force the valve body 19 downwards, while the cap or cover 15, which is releasably locked to the valve body, will provide a retaining force on the end of the valve stem 20, exerted in opposite direction, maintaining the sealing pressure of the valve body 19. Since the upwards force provided by the cap or cover 15 is larger than the low pressure acting on the opposite side of the valve 19, a fluid tight sealing effect is provided, preventing water from escaping through the nozzle 11.

FIG. 2 shows schematically the section through the embodiment shown in FIG. 1, where the cap or cover 15 has been released from its position on the nozzle 11. Such release is obtained by means of a release mechanism which will be described in further detail below. As indicated the cap or cover 15 has been fixed to the nozzle 11 by means of an attachment plate 16 screwed on to a threaded part on a flange 23 at the end of the nozzle 11, the attachment plate 16 being provided with a boring with corresponding threads. The threads are preferably links threaded, enabling the attachment plate 16 and the cap or cover 15 to be screwed on to the nozzle 11 without jeopardizing the sealing effect of threaded joint between the nozzle 11 and the liquid supply line. Both the method applied for obtaining the locking effect of the cap or cover 15 to the nozzle 11, and the function of the releasable valve 18 will be described in further details below.

The attachment plate 16 is provided with one or more locking surfaces 24, configured to co-act with corresponding locking surfaces 24 arranged on the cap or cover 15, such locking surfaces 24 preferably, but not necessarily, being more or less skewed in the axial direction of the nozzle 11. The locking surfaces on the cap 15 are preferably arranged on an internal surface of a rim or a skirt on the cap and having skewed or inclined surfaces faced radially inwards towards the center axis of the cap 15 and arranged on the inner circumferential surface of the cap, while the corresponding locking surfaces on the attachment plate 16 are given a correspondingly skewed or inclined shape to enable the interlocking function with the skewed or inclined surfaces on the cap 15. The inclined or skewed surfaces on the attachment plate 16 are arranged along the circumference of the attachment plate 16, preferably in recessed parts of the attachment plate 16. The assembled nozzle 11 is also provided with a releasable locking mechanism, allowing the valve 19 move axially within the central bore of the nozzle 11, allowing water to flow out of the nozzle 11 in the form of a fine graded liquid mist or firefighting spray, releasable locking effect being provided by the cap 15.

Figure 3C:
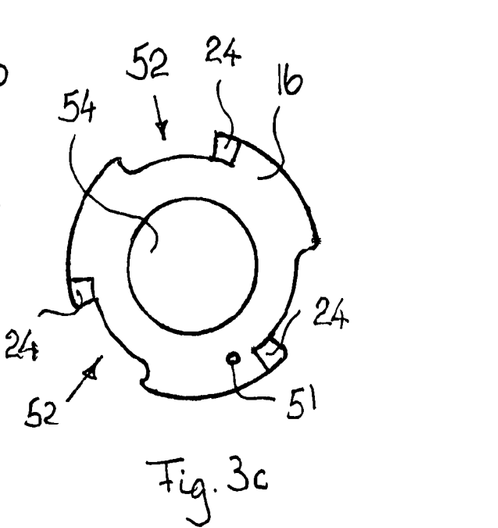
FIG. 3c shows schematically a top view of an attachment plate intended to be screwed on to a threaded flange on the nozzle body, the Figure showing the attachment plate from the side being intended to face towards the nozzle.
Figure 6:
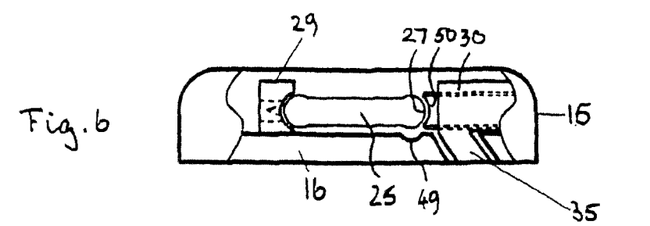
FIG. 6 shows schematically a side view, partly in section, of the cap or cover shown in FIGS. 4 and 5, also indicating the locking edges for locking the cap or cover to the attachment plate in a releasable manner to the nozzle body.

FIG. 3c shows schematically a top view of an attachment plate 16 intended to be screwed on to a threaded flange 23 on the nozzle 11 body, the Figure showing the surface being intended to face towards the nozzle 11. As shown, the attachment plate 16 is provided with a centrally arranged hole 54 provided with internally arranged links threads enabling the plate 16 to be screwed on to the flange 23 on the nozzle body. Correspondingly, said flange 23 also being provided with corresponding links threads. Along its outer periphery, the attachment plate is provided with three recesses 52, milled out from the attachment plate 16. One of the end surfaces of each recess 52 is given a slanted or inclined surface 24, intended to cooperate with correspondingly inverted shaped surface inside the cap or cover 15, ref. FIG. 6 below. The attachment plate 16 is also provided with a hole 51 intended to receive one end of a seat support 29 for a trigger rod 25, ref. description of FIGS. 7-9 below.

Figure 4:
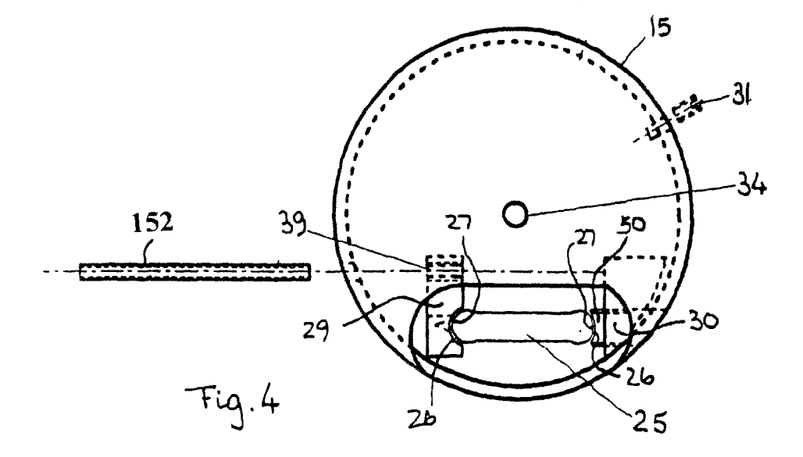
FIG. 4 shows a top view of the cap or cover in assembled position, ready to be connected to the nozzle body, also indicating a possible retracted, offset position from the center axis of the trigger rod.

FIG. 4 shows a top view of one embodiment of the cap or cover 15 in assembled position with the attachment plate 16, ready to be connected to the nozzle body 11, also indicating a possible position of the release mechanism 25. The release mechanism 25 is preferably arranged in a position off the center of the cap or cover 15 producing the required pressure between the support surfaces on the cap 15 and the attachment plate 16 to produce the required locking force. The release mechanism 25 may be in the form of a trigger rod, a seat support 29 fixed to the attachment plate 16 and a corresponding seat support 30 fixed to the cap or cover 15, one end of which exerting an outwards pressure or force on a surface 26 fixed to the cap or cover 15, while the other end exert a pressure or a force in opposite direction on to a surface 27 fixed to the attachment plate 16 or the nozzle 11. The trigger rod 25 may have a cylindrical shaped, hollow part containing a liquid such as water, the wall of the hollow shaped part being extremely thin, allowing the trigger rod to break when subjected to a predetermined increase in temperature of the surroundings due to expansion of the liquid inside said hollow section. At each end, the trigger rod 25 may preferably be provided with a double curved end surface 27 intended to be supported by the correspondingly shaped surfaces on the attachment plate 16 and the cap or cover 15.

Figure 5:
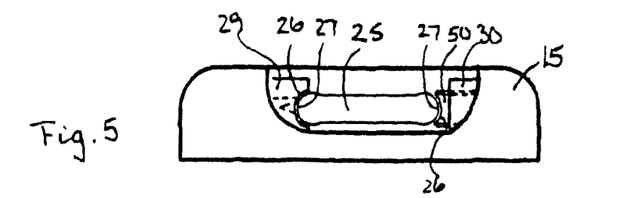
FIG. 5 shows schematically a side view of the cap or cover shown in FIG. 4.

As shown in FIGS. 4-6, the release mechanism 25, 27, 29 is positioned in a retracted position inside the cap or cover 15, thus covered by the cap 15 and not projecting outwards from the nozzle as is common standard for the prior art nozzles. In this way the release mechanism 25 is protected from unintentional tampering or manipulation; or from accidental, unintentional releasing. Further, the cap or cover 15 is provided with several openings (not shown) and internal spacing, allowing the ambient air to flow through the cap or cover 15, past the release mechanism 25, thereby securing that the release mechanism 25 will suspend or release the sealing effect of the nozzle 11 in case of increased temperature in the ambient air. In such way it is possible to secure that the release mechanism will react quicker when the nozzle is subjected to increased temperature in the ambient air caused by a fire. According to the embodiment shown in FIGS. 4-6 the opening in the cap or cover 15 exposing the release mechanism 25 to the ambient air has a more or less segment shaped form. It should be appreciated, however, that the opening in the cover or cap surface may be in the form of an elongate slot, positioned over the release mechanism. Further the cap or cover 15 may also be provided with slots or openings in the rim of the cap or cover, arranged at least on one side of the cap 15 with respect to the release mechanism 25, preferably also on the opposite side of the release mechanism 25, thereby enhancing the flow of ambient air through the cap 15 and past the release mechanism 25.

By making the surfaces 26, 27 double curved, it is possible to achieve self alignment of the trigger rod 25 with respect to the support surface on the cap 15 and on the attachment plate 16. Further, by allowing the supporting surface 26 on the cap to be arranged on the end of a set screw, configured to be screwed in or out in axial direction of the trigger rod 25, it is also possible to pretension or adjust the axial tension in the trigger rod 25. Further, by providing a dent or a groove on the inner surface of the attachment plate 16 in the proximity of the end of the trigger rod 25 being in contact with the set screw, the trigger rod 25 may as part of the assembling procedure be brought with one end 26 in contact with the curved supporting surface 26 on the attachment plate 16, while the other end of the trigger rod 25 is held in contact with the groove 49 on the inner surface of the attachment plate 16, while screwing the set screw 50 in axial direction inwards, allowing the lower part of the set screw curved surface to first come into contact with the bulb end of the trigger rod 25, lifting up and aligning the trigger rod 25 in proper axial direction.

Although the embodiment of the release mechanism 25 shown comprises a trigger rod, it should be appreciated that also other types of release mechanisms may be used, provided such alternative release mechanism will secure that the cap 15 is dropping off when the release mechanism is actuated, releasing the sealing effect of the valve body 19.

In order to adjust the locking effect between the cap 15 and the attachment plate 16, the contact surface for the trigger rod 15 on the cap may be the end of a set screw 31, rotatably arranged in a threaded hole in the sidewall of the cap 15, one end of said set screw 31 being accessible from the exterior of the cap wall to enable adjustment of the locking force induced on to the trigger rod 25. Alternatively, such adjustment means may be in the form of a tap pressed against the trigger rod 25 by means of a spring. It should be noted that during replacement of a trigger rod 25, the set screw may be partly screwed out, easing the replacement of a new trigger rod 25 and thereupon tightened up.

The locking contact pressure between the support surfaces 26, 27 may be axially oriented with respect to the nozzle axis. Alternatively, the surfaces 26, 27 may be slanted or skewed in axial direction, the direction of inclination being in circumferential direction of the nozzle 11 and the cap or cover 15. The smaller surface pitch of the more or less helical shaped slanted or inclined surface in axial direction of the nozzle 11, the smaller pressure from the trigger rod 25 will be required to obtain the required locking pressure, and vice versa.

As further shown in FIG. 5, the assembled cap or cover 15 and the attachment plate 16 are provided with aligned threaded bores intended for receiving a threaded bolt or pin, intended to be screwed into the aligned holes when there is a need, for example, to check or replace the trigger rod 25, without having to remove the cap 15 and thereby releasing the locking mechanism without causing a mist or firefighting spray. The threaded pin 152 may also be used for locking the cap 15 and the attachment plate 16 closer together. As an additional locking mechanism for locking the cap 15 and the attachment plate 16 together, for example during replacement of the trigger rod 25 a set screw, screwed through a threaded hole in the side wall of the cap 16 or in the attachment plate 16, engaging the attachment plate 16 in a locking way, may be used, thereby securing that cap 15 is not released from the attachment plate 16 during such replacement.

Centrally arranged in the cap 15, the cap 15 is also provided with a hole 34 configured for venting air from the nozzle 11. Such venting system will be described in further details below, referring to FIG. 12.

FIG. 5 shows schematically a side view of the cap or cover 15 shown in FIG. 4. As shown both in FIGS. 4 and 5, the cap 15 is provided with a window enabling access for maintenance or replacement of the trigger rod 25 and also for free exposure of the trigger rod 25 to the surrounding temperature, enabling the trigger rod 25 to break if and when subjected to the designed breaking temperature caused by a fire.

FIG. 6 shows schematically a side view, partly in section, of the cap or cover 15 shown in FIGS. 4 and 5, also indicating the locking means for locking the cap or cover 15 in a releasable manner to the nozzle body 11. The locking means for locking the cap 15 to the attachment plate 16 may be in the form of an inclined or skewed surface in a female member 36, such as a hole or a recess of the attachment plate, and a corresponding inclined or skewed surface on a male member 35 fixed to the cap or cover 15. The number of locking means, i.e. male and female members, functioning for example as a bayonet catch, may for example be two or more, preferably three, inclined surfaces, evenly spaced around the periphery of the attachment plate 16 and correspondingly on the cap or cover 15.

In assembled condition, the attachment plate 16 and the cap 15 are assembled, the female members 36 being entered onto the male members 35, the locking surfaces of each pair of male and female units being in contact with each other, one end 27 of the trigger rod 25 being in forced contact with a seat 28 fixed to the attachment plate 16, while opposite end of the trigger rod 27 being in forced contact with a corresponding seat 28 or surface fixed to cap or cover 15, the trigger rod 25 producing an outwards directed force, forcing the locking surface on the male elements 35 into locking contact with the corresponding locking surfaces on the female element 36, keeping the attachment plate 16 and the cap to be interconnected in a release able manner. Once the two units 15, 16 are assembled with trigger rod 25 installed, the assembled unit 15, 16 may be screwed on to the links threaded flange 23 on the nozzle 11 body. In such assembled position, screwed on to the flange on the nozzle 11, the valve stem 20 of the valve body 19 is forced inwards into sealing contact with sealing surface 21 in the central bore 14 of the nozzle.

It should be noted that the pitch angle of the skewed surfaces with respect to the vertical axis may preferably be five degrees or more. The larger angle, the larger water pressure in the nozzle 11 may be resisted by the cap 15 without releasing the nozzle unintentionally. The angle may for example be in the region 3-45 degrees, depending on the water pressure in the nozzle.

If and when the trigger rod breaks due to external heat, the locking effect between the interconnected skew surfaces is released, causing a slight rotation, releasing the locking effect of the bayonet lock When all the assembled caps 15 and attachment plates 16 are fitted on all the nozzles 11 of the fire fighting system pressurized water may be applied to the system. In such condition, there is a tendency for air to be trapped in the nozzles. In order to vent the nozzles individually, and the system as a whole, the cap is provided with a centrally arranged opening 34, said opening 34 communicating with a venting valve means in the internally arranged valve 18 of the nozzle. The features and functions of such venting valve will be described below in conjunction with the description of FIG. 12.

In assembled state, the nozzle 11 is subjected to an internal pressure acting on the piston or valve body 19 of the valve 18, tending to urge the piston 19 downwards. The end of the stem 20 of the piston 18 is prevented to move away from its sealing seat 21 in the nozzle 11, since the end of the stem 20 is resting on the internal surface of the cap 15, locked to the attachment plate 16 by means of the trigger rod 25 and the interconnected locking surfaces on the cap 15 and the attachment plate 16.

When the ambient temperature increases due to a fire or when a fire is detected, the trigger rod 25 breaks and falls off due to expansion of the heated liquid inside the trigger rod 25, whereby the locking effect of the trigger rod 25 is eliminated, releasing the locking effect between the locking surfaces on the cap 15 and the attachment plate 16, allowing the cap 15 drop off its temporary seat on the attachment plate 16. As a consequence, the valve piston is moved from its sealing position shown in FIG. 3a to the open valve position shown in FIG. 3a, allowing water to enter into the space below in the nozzle and out through a number of fine apertures, producing the required fine droplet mist or firefighting spray.

When the fire has come to an end, the water supply valve must be closed, the cap 15 must be attached to the attachment plate again and the broken trigger rod 25 must be replaced, the piston stem 20 then being forced up, forcing the piston 19 into sealing re-engagement with its seat. The system must then be vented for trapped air.

Figure 7:
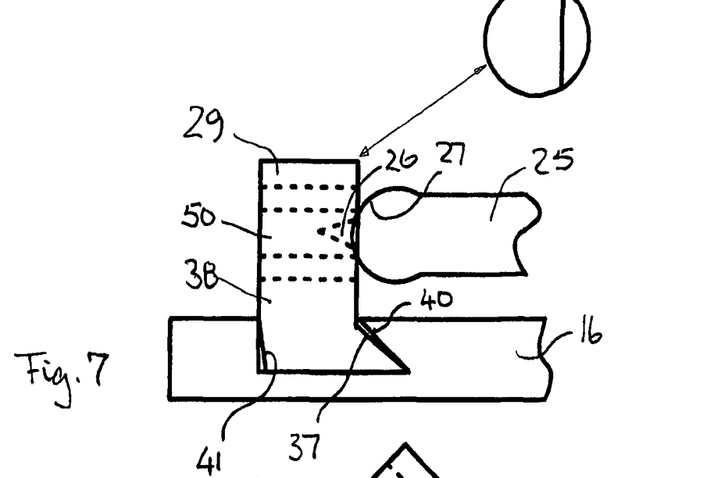
FIG. 7 shows schematically a section through one of the locking and retaining edges, also indicating one end of the trigger rod position with respect to the attachment plate.
Figure 8:
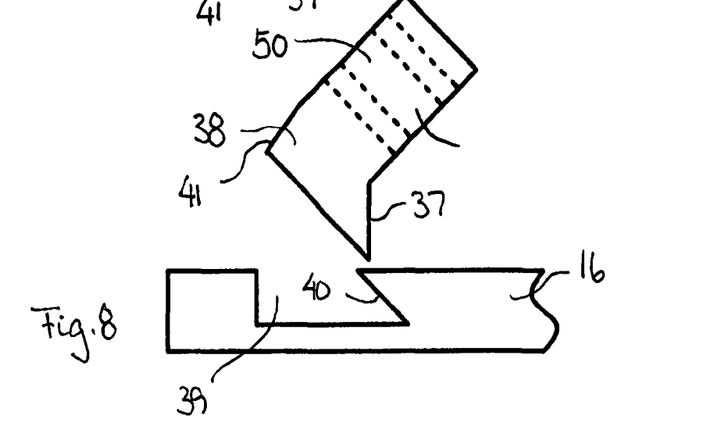
FIG. 8 shows schematically the same view as shown in FIG. 7, where the trigger rod has left its position and where a locking edge of the attachment plate is in the process of dropping off from its seat on the attachment plate.
Figure 9:
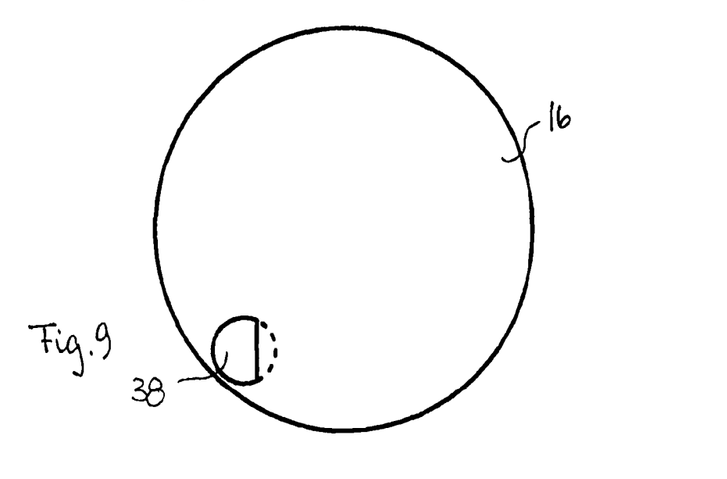
FIG. 9 shows a horizontal top view of a simplified embodiment of the attachment plate, the centrally arranged threaded hole and possible recesses with slanted or inclined surfaces not being shown.

FIGS. 7-9 show an alternative embodiment of attachment plate 16. FIG. 7 shows schematically a section through the attachment plate 16 through one of the locking and retaining edges for the trigger rod 25 on the attachment plate 16, also indicating one end of the trigger rod 25 position with respect to the attachment plate 16. FIG. 8 shows schematically the same view as shown in FIG. 7, where the trigger rod has left its position and where the seat support 29 for the trigger rod 25 is about to drop off its position on attachment plate 16, while FIG. 9 shows a horizontal top view of a simplified embodiment of the attachment plate, the centrally arranged, axial threaded hole not being shown.

According to the embodiment shown in FIGS. 7 and 8, the seat support 29 for the trigger rod 25 is removably attached to the attachment plate 16. According to this embodiment the seat support 29 is arranged on a pin 38 seated in a hole 39 in the attachment plate 16, on the surface facing away from the nozzle 11. The pin 38 has at its upper part a recess or notch 26 configured to receive the end of the trigger rod 25, while the opposite end is provided with slanted or skewed surface 37, extending laterally out from the pin 38 and configured to interact with a correspondingly slanted or skewed surface 40 formed as an indent in the hole 39, have a larger base than opening. At the lower end of the pin 38, on the opposite side of the slanted or skewed lower surface 37, the pin 38 is provided with a chamfered surface 41, configured to enhance the drop-off of the pin 38 from the attachment plate 16 when the cap (not shown) is released from its seat on the attachment plate 16 due to breaking of the trigger rod 25. As shown in FIGS. 7 and 8, the pin 38 is also provided with a threaded hole 50 for the threaded bolt 152, the hole 50 being aligned with a hole in the rim of the cap 15 and a corresponding threaded hole (not shown) in the seat support attached to the cap 15.

FIG. 9 shows schematically a top view of the attachment plate 16, indicating one position of the pin 38, securing an offset positioning of the trigger rod 25 so as to provide access to the venting system for the nozzle, through the centrally arranged hole 33 in the cap 15.

Figure 10:
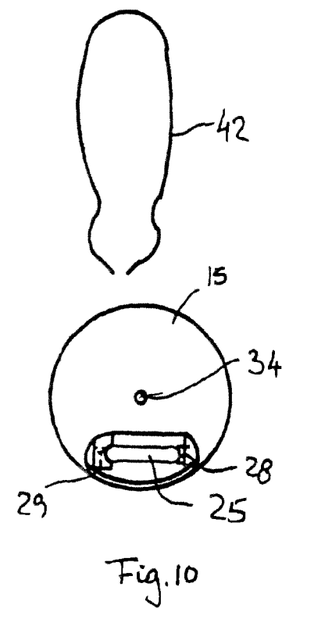
Figure 11:
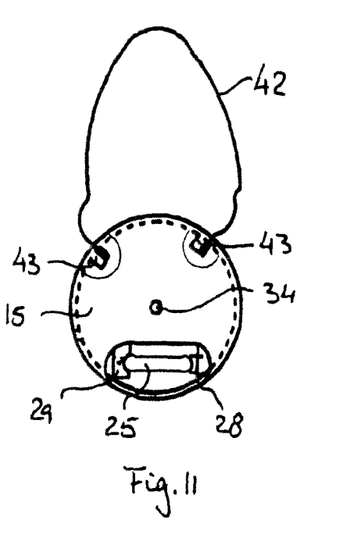

FIG. 10 and FIG. 11 show an alternative embodiment for temporarily locking the cap or cover 15 to the attachment plate 16 for service, maintenance or repairing activities, FIG. 10 showing the temporarily locking means in a dissembled state, while FIG. 11 shows, partly in section, the locking means in connected state on the assembled cap 15/attachment plate 16.

The alternative embodiment comprises a loop or a clamp 42, preferably, but not necessarily, a resilient or flexible material, such as for example 1 mm spring steel, configured to be inserted through two holes 43 in the cap 15 and corresponding aligned holes in the attachment plate 16.

Figure 12:
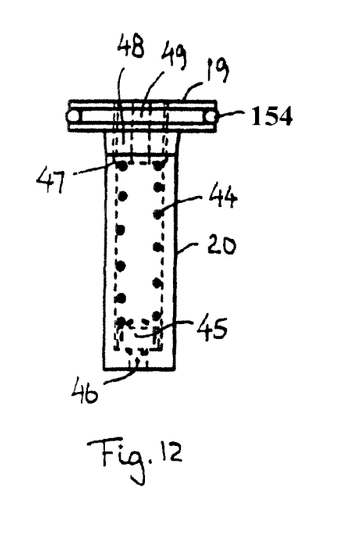
FIG. 12 shows schematically a section through the centrally arranged valve of the nozzle, indicating the venting seal means.

FIG. 12 shows schematically a section through the centrally arranged valve body 19 and the stem 20. Around its periphery, the valve body 19 is provided with a recess for seating a sealing O-ring 154. Further, the stem is made hollow, housing a helical spring 44, seated at its lower end on a sphere or a sealing body 45, the spring 44 forcing the sphere; ball or sealing body 45 downwards, for closing an opening 46 extending through the bottom plate of the stem 20. At its upper end the spring 44 rests against an adjustable, inner seat 47 at the top of the stem 20, the means for adjustment being a threaded cylinder 48 which is screwed into a threaded hole through the valve body 19, the cylinder 48 also having a centrally arranged hole 49. Hence, a venting duct is provided through the entire valve body 19, and stem 20, such venting duct being sealed by means of the spring 44, forcing the sphere or ball 45 into sealing contact with its seat at the end of the stem, thus closing the access through the lower opening 46.

During up-start of the firefighting system, when water has been supplied to the system and the valves are in sealing contact with its seat, pockets of air may have been formed inside the various valves. In order to vent in an easy and efficient manner without any water spillage or at least a very small water spillage, it is possible to introduce pin in through the centrally arranged hole 34 in the cap 15. lifting the sealing sphere 45 or sealing body slightly off its sealing contact, allowing possible air trapped inside the valve to escape out through the opening 46. Such procedure may be repeated at intervals, so as to avoid build-up of trapped air pockets inside the firefighting system.

Although the cap/attachment plate is described above in conjunction with a low pressure mist producing nozzle, it should be appreciated that the invention may be applied on any types of water based firefighting nozzles without deviating from the inventive idea. Such other type of nozzles may for example, but exclusively be high pressure nozzles, nozzles of the sprinkler type, nozzles used in factories or in living quarters concepts, or the like.

The invention claimed is:

1. Method for firefighting using a system having a firefighting medium emitted from one or more nozzles installed on a wall or in a ceiling, where the firefighting medium is supplied and allowed to escape from the nozzle through one or more apertures, the nozzle being provided with an internally arranged valve in sealing contact with a valve seat until the valve is released from its sealing position, said release being caused by a heat sensitive release mechanism acting on the valve, whereby the sealing effect of the valve is relieved, the method comprising:

providing a locking force required for maintaining the sealing effect by means of a removable cap or cover acting as part of a locking mechanism, the removable cap or cover attached to and covering at least a part of the nozzle front, the cap or cover extending from the wall or ceiling and covering the nozzle and the apertures of the nozzle, said locking force being established between at least two interacting surfaces;

releasing the sealing effect of the valve by removing a sealing effect between said at least two interacting surfaces;

allowing the cap or cover to drop off its seat on the nozzle; and relieving the pressure causing the sealing effect on the valve of the nozzle, the removal of the cap or cover being caused by the heat sensitive release mechanism, wherein the cap or cover is releasably attached to the nozzle by means of a locking force, caused by friction established between surfaces on the cap or cover and interacting surfaces on the nozzle front, such locking force being produced by a heat sensitive trigger rod of the heat sensitive release mechanism producing the required locking contact between one or more pairs of interacting surfaces, wherein one end of the heat sensitive trigger rod is in forced contact with a seat fixed to an inner wall of the cap or cover, and an other end of the heat sensitive trigger rod is in forced contact with a seat fixed to an attachment plate attached to a free end surface of the nozzle, wherein the interacting surfaces are inclined or slanted with respect to the axial direction of the nozzle, wherein the heat sensitive release mechanism is positioned between the cap or cover and the nozzle, and the cap or cover is provided with one or more holes in its rim, communicating with the release mechanism through space between the cap and a front of the nozzle.

2. The method according to claim 1, wherein the cap or cover is configured to be removed by a rotational movement of the cap or cover around the axis of the nozzle when the locking force from the release mechanism is suspended.

3. The method according to claim 1, wherein the removable cap is configured in such way that it is possible to remove the heat sensitive release mechanism without having to drain the system and/or without releasing the sealing effect of the valve.

4. The method according to claim 1, wherein air, which is possibly trapped in the system, may be vented out without removing the locking mechanism, bringing water or other types of firefighting medium to each individual nozzle.

5. The method according to claim 1,
wherein the cap or cover has a set screw rotatably arranged in a threaded hole in a sidewall of the cap, one end of the set screw being accessible from an outside of the cap, the set screw allowing for adjustment of friction established between surfaces on the cap or cover and interacting surfaces on the nozzle front.

6. The method according to claim 1, wherein the trigger rod has a shape to allow arrangement of the trigger rod within the cap or cover via contact points on the trigger rod and contact points on an internal cap surface and a corresponding surface of the nozzle.

7. The method according to claim 1, wherein the cap or cover has an opening with internal surfaces of the cap or cover disposed in a position corresponding to the position of the trigger rod, and the trigger rod is oriented in parallel with the internal surfaces.

8. The method according to claim 1, wherein the trigger rod is eccentrically positioned with respect to an axis of symmetry of the cap or cover.

9. The method according to claim 1, wherein the cap or cover covers an entire surface of the nozzle and a hole in the wall or ceiling at which the nozzle is attached.

10. A nozzle intended to be installed on a wall or in a ceiling for firefighting purposes, the nozzle being configured to produce a flow of firefighting liquid from a fluid source into a room or a space, by forcing the supplied fluid out through openings or apertures in the nozzle, the nozzle comprising:
an internally arranged valve configured to be in sealing contact with a valve seat until the valve is released from its sealing position, said releasing being caused by a heat sensitive release mechanism acting on the valve, providing and suspending the sealing effect of the valve,
wherein the release mechanism comprising a cap connected to the nozzle front in such way that when a fire or sufficient high temperature is detected, the cap is configured to drop off its seat on a nozzle end, suspending the sealing effect of the valve and allowing fluid to flow through the nozzle, producing the required mist or firefighting spray,
wherein the cap is releasably attached to the nozzle by a locking force, caused by friction established between surfaces on the cap and interacting surfaces on the nozzle front, such locking force being produced by a heat sensitive trigger rod of the heat sensitive release mechanism producing the required locking contact between one or more pairs of interacting surfaces, wherein one end of the heat sensitive trigger rod is in forced contact with a seat fixed to an inner wall of the cap or cover, and an other end of the heat sensitive trigger rod is in forced contact with a seat fixed to an attachment plate attached to a free end surface of the nozzle,
wherein the interacting surfaces are inclined or slanted with respect to the axial direction of the nozzle,
wherein the release mechanism is positioned between the cap or cover and the nozzle, and the cap or cover is provided with one or more holes in its rim, communicating with the release mechanism through space between the cap and a front of the nozzle.

11. The nozzle according to claim 10, wherein one of the surfaces in a pair being formed on the cap and the other surface being formed on the attachment plate attached to a free end surface of the nozzle.

12. The nozzle according to claim 11, wherein the interacting surfaces on the attachment plate being arranged along the circumference of the attachment plate.

13. The nozzle according to claim 10, wherein the cap is provided with one or more devices configured to temporarily lock the cap in position with respect to the nozzle in periods where the release mechanism shall be repaired, maintained or replaced.

14. The nozzle according to claim 13, wherein the one or more devices configured to temporarily lock the cap is either in the form of one or more set screws, screwed through a rim of the cap and engaging the nozzle or the attachment plate in a locking manner, or a long screw which extends between two pairs of locking surfaces, locking the interacting surfaces together.

15. The nozzle according to claim 10, wherein the nozzle is provided with means for venting the nozzle, such venting means comprising a valve comprising a ball pressed into sealing contact by a spring and access manipulating the sealing contact through an opening in the cap.

16. The nozzle according to claim 10, wherein the trigger rod has a shape to allow arrangement of the trigger rod within the cap via contact points on the trigger rod and contact points on an internal cap surface and a corresponding surface of the nozzle.

17. The nozzle according to claim 10, wherein the cap has an opening with internal surfaces of the cap disposed in a position corresponding to the position of the trigger rod, and the trigger rod is oriented in parallel with the internal surfaces.

18. The nozzle according to claim 10, wherein the trigger rod is eccentrically positioned with respect to an axis of symmetry of the cap.

19. The nozzle according to claim 10, wherein the cap covers an entire surface of the nozzle and a hole in the wall or ceiling at which the nozzle is attached.

20. Method for firefighting using a system having a firefighting medium emitted from one or more nozzles installed on a wall or in a ceiling, where the firefighting medium is supplied and allowed to escape from the nozzle through one or more apertures, the nozzle being provided with an internally arranged valve in sealing contact with a valve seat until the valve is released from its sealing position, said release being caused by a heat sensitive release mechanism acting on the valve, whereby the sealing effect of the valve is relieved, the method comprising:
providing a locking force required for maintaining the sealing effect by means of a removable cap or cover acting as part of a locking mechanism, the removable cap or cover attached to and covering at least a part of the nozzle front, said locking force being established between at least two interacting surfaces;

releasing the sealing effect of the valve by removing a sealing effect between said at least two interacting surfaces;

allowing the cap or cover to drop off its seat on the nozzle;

relieving the pressure causing the sealing effect on the valve of the nozzle, the removal of the cap or cover being caused by the heat sensitive release mechanism, wherein the cap or cover is releasably attached to the nozzle by means of a locking force, caused by friction established between surfaces on the cap or cover and interacting surfaces on the nozzle front, such locking force being produced by a heat sensitive trigger rod of the heat sensitive release mechanism producing the required locking contact between one or more pairs of interacting surfaces, wherein the interacting surfaces are inclined or slanted with respect to the axial direction of the nozzle, wherein the heat sensitive release mechanism is positioned between the cap or cover and the nozzle, and the cap or cover is provided with one or more holes in its rim, communicating with the release mechanism through space between the cap and a front of the nozzle; and holding the cap in fixed position when removing the heat sensitive release mechanism by inserting one or more pins into holes in the cap, the holes being aligned with corresponding holes or recesses in the nozzle body, thus preventing the cap from dropping off from its seat on the nozzle during such stage.

21. A nozzle intended to be installed on a wall or in a ceiling for firefighting purposes, the nozzle being configured to produce a flow of firefighting liquid from a fluid source into a room or a space, by forcing the supplied fluid out through openings or apertures in the nozzle, the nozzle comprising:

an internally arranged valve configured to be in sealing contact with a valve seat until the valve is released from its sealing position, said releasing being caused by a heat sensitive release mechanism acting on the valve, providing and suspending the sealing effect of the valve, wherein the release mechanism comprising a cap connected to the nozzle front in such way that when a fire or sufficient high temperature is detected, the cap is configured to drop off its seat on a nozzle end, suspending the sealing effect of the valve and allowing fluid to flow through the nozzle, producing the required mist or firefighting spray, wherein the cap is releasably attached to the nozzle by a locking force, caused by friction established between surfaces on the cap and interacting surfaces on the nozzle front, such locking force being produced by a heat sensitive trigger rod of the heat sensitive release mechanism producing the required locking contact between one or more pairs of interacting surfaces, wherein the interacting surfaces are inclined or slanted with respect to the axial direction of the nozzle, wherein the release mechanism is positioned between the cap or cover and the nozzle, and the cap or cover is provided with one or more holes in its rim, communicating with the release mechanism through space between the cap and a front of the nozzle; and a set screw rotatably arranged in a threaded hole in a sidewall of the cap, one end of the set screw being accessible from an outside of the cap, the set screw allowing for adjustment of friction established between surfaces on the cap and interacting surfaces on the nozzle front.

* * * * *